(12) United States Patent
Adam et al.

(10) Patent No.: US 7,414,752 B2
(45) Date of Patent: Aug. 19, 2008

(54) SCANNER AND PRINTER PROFILING SYSTEM

(75) Inventors: George E Adam, Andover, MA (US); James W Vogh, Jr., Methuen, MA (US)

(73) Assignee: X-Rite, Inc., Grand Rapids, MI (US)

( * ) Notice: Subject to any disclaimer, the term of this patent is extended or adjusted under 35 U.S.C. 154(b) by 527 days.

(21) Appl. No.: 10/743,175

(22) Filed: Dec. 22, 2003

(65) Prior Publication Data
US 2004/0130739 A1 Jul. 8, 2004

Related U.S. Application Data

(62) Division of application No. 09/475,576, filed on Jan. 5, 2000, now Pat. No. 6,671,067.

(51) Int. Cl.
*G06F 15/00* (2006.01)
(52) U.S. Cl. .................. 358/1.9; 358/504; 358/518
(58) Field of Classification Search .................. 358/1.9, 358/1.6, 504, 518, 406, 3.23; 382/162
See application file for complete search history.

(56) References Cited

U.S. PATENT DOCUMENTS

| | | |
|---|---|---|
| 4,500,919 A | 2/1985 | Schreiber |
| 5,185,673 A | 2/1993 | Sobol |
| 5,271,096 A | 12/1993 | Cook |
| 5,491,568 A | 2/1996 | Wan |
| 5,537,516 A | 7/1996 | Sherman et al. |
| 5,543,940 A * | 8/1996 | Sherman ................. 358/518 |
| 5,754,184 A | 5/1998 | Ring et al. |
| 5,760,913 A | 6/1998 | Falk |
| 5,809,213 A | 9/1998 | Bhattacharjya |
| 5,818,960 A | 10/1998 | Gregory, Jr. et al. |
| 6,008,907 A | 12/1999 | Vigneau et al. |
| 6,055,071 A * | 4/2000 | Kuwata et al. ............. 358/501 |
| 6,072,588 A * | 6/2000 | Dohnomae ................ 358/1.9 |
| 6,320,668 B1 * | 11/2001 | Kim ........................ 358/1.1 |
| 6,404,517 B1 | 6/2002 | Chao ........................ 358/504 |
| 6,480,299 B1 * | 11/2002 | Drakopoulos et al. ........ 358/1.9 |
| 6,483,607 B1 * | 11/2002 | Van de Capelle et al. .... 358/1.9 |
| 6,546,129 B1 * | 4/2003 | Ohta et al. ................. 382/162 |
| 6,547,360 B2 * | 4/2003 | Takahashi et al. ............. 347/19 |
| 6,757,076 B1 * | 6/2004 | Mestha et al. ............... 358/1.9 |
| 6,822,757 B1 * | 11/2004 | Usami et al. ................ 358/1.9 |
| 6,873,432 B1 * | 3/2005 | Thieret ..................... 358/1.9 |

* cited by examiner

*Primary Examiner*—Mark Zimmerman
*Assistant Examiner*—Benjamin O Dulaney
(74) *Attorney, Agent, or Firm*—McCarter & English, LLP

(57) ABSTRACT

An improved color correction system and more specifically, a color profiling system for a printer and scanner. Highly accurate device independent printer profiles are generated using a scanner and processing means. The process utilizes the simultaneous scanning of a reference target and a print target to produce a scanner profile. Uncompensated printer profile is developed using the scanner profile and compensation transforms convert the uncompensated printer profile into the printer profile.

15 Claims, 7 Drawing Sheets

SCANNER AND PRINTER PROFILING SYSTEM

RELATED APPLICATIONS

This application is a divisional of U.S. application Ser. No. 09/475,576, filed Jan. 5, 2000 and is herein incorporated in its entirety by reference.

FIELD OF THE INVENTION

The present invention relates most generally to color correction of computer peripheral devices and more particularly to a color profiling system for a printer and scanner.

BACKGROUND OF THE INVENTION

Color is defined as the perceptual result of light in the visible region of the spectrum. The human retina has three types of color photoreceptor cells for illumination therefore it is possible to define color using only three numerical components.

The Commission Internationale de L'Éclairage (CIE) created a standardized system for representing color illuminations using three numerical components to represent the mathematical coordinates of color space. The colors produced by reflective systems are a function not only of the colorants but also of the ambient illumination that requires further spectral matching. The most familiar color systems include CIE XYZ, CIE xyY, CIE L*u*v* and CIE L*a*b*.

The CIE system is based on the description of color as luminance component Y and spectral weighting curves components X and Z. The spectral weighting curves for X and Z were standardized by the CIE based on statistics from experiments involving human observers. The magnitudes of the XYZ components are proportional to physical energy, but their spectral composition corresponds to the color matching characteristics of human vision.

Most devices employ a device-dependent color-coordinate system to specify the colors, and there are several different systems in the market. The coordinate system is defined in a color space that maps the color coordinates to the color mechanism used by the device. Color space refers to an N-dimensional space in which each point in the space corresponds to a color. The cyan (C), magenta (M), yellow (Y) and black (K) (CMYK) color space is commonly used for color printers, where each point in the CMYK color space corresponds to a color produced using a formula for the CMYK colorants. The color space could be represented solely by CMY, but black is added as a colorant for print matter for several reasons. Printing black by overlaying cyan, yellow and magenta ink is expensive and time-consuming, and the edges of the lettering tend to blur. The printing of three ink layers to produce black also causes the printed paper to become wet requiring more time to dry.

The red, green and blue (RGB) system is a color space system that is complementary to the CMYK color space. The RGB system is a three-dimensional color space wherein each point in the color space is formed by some combination of RGB colorants. The RGB system is typically used for computer monitors, TV screens and scanners—illuminating devices.

The term color gamut is used to refer to a range of colors that can be produced within a color space by a particular device from a set of colorants. The color gamut of a device corresponds to the visible colors that can possibly be produced by the device.

A digitized color image is represented as an array of pixels, wherein each pixel contains numerical components that define a color. The three components are required to represent an image, and printing necessitates a fourth component, namely black. Color printers and color copy machines typically use three or four colorants, such as CMYK to produce the color image. The combination mix and density of the colorants produce a wide array of shades and colors.

While the three numerical values for digitized images could be provided by a color specification system, the color coding systems require faster processing. Several other systems have developed for image coding, including linear RGB, nonlinear R'G'B', nonlinear CMY, nonlinear CMYK, and derivatives of nonlinear R'G'B' such as Y'CBCR. RGB values can be transformed to and from the CIE XYZ values by a three-by-three matrix transform.

A scanner is used for converting print mediums such as pictures, artwork, documents, transparencies, and photographs into an electronic format. The scanner captures an image by measuring colors reflected from or transmitted through an image at many points and assigns numerical values to the colors at those points. Normally, the scanned image is represented as digital data, called pixels, in a Red-Green-Blue (RGB) representation. The pixels are arranged into a table of rows and columns, and contain information about the image such as the color information for a particular pixel defined as some formula of the primary colors R-G-B. Some scanners convert the RGB values to CMYK values.

The reproduction of color information from multiple devices and varying environments is a common occurrence in the industry. Colored works are transferred among variety of peripheral devices and the color information processing systems within the various systems seek to ensure the accuracy of the original work. For example, a computer with a color monitor can interact with a colored printer, a scanner, digital camera, color copy machine, color facsimile and various other devices. As the color data passes from one medium to another, digital processing attempts to maintain a visual match within the capabilities of the devices.

Advances in technology and computing means have made color reproduction systems available to the general public. Many desktop publishing systems employ hardware and software that are affordable to users that need to produce quality color work products. Unfortunately, the concept of 'What you see is what you get' is normally lacking, and it is not uncommon to see the desired image on the monitor but produce a print product that lacks the quality characteristics desired.

Colors produced by two different devices based on the same input will differ, in part because of distortion of the signals which occur due to nonlinear response characteristics of the electronics of the devices and the method of selecting a color within a device color gamut. An input signal representing a particular color provided to two different devices typically results in the devices producing two different colors. This is true even when the input signal represents a color within the color gamuts of both of devices.

In order to accomplish accurate color transfer, the individual devices employ color calibration techniques. Calibration is necessary to set the color response of the color reproduction devices. The process of deriving a transform by comparing the device output to some reference output and generating a lookup table is called system color calibration. A transform derived for a particular scanner-printer combination is referred to as a closed system and the process is called closed system color calibration.

The purpose of the calibration is to account for the color differences. The color differences actually refer to numerical differences between the color specifications and more specifically refers to the perception of color differences in XYZ or RGB. Perceptual uniformity concerns numerical differences that correspond to color differences at the threshold of perceptibility. A perceptually uniform system is one where a small change to a component value is equally perceptible across the entire range. XYZ and RGB systems are not perceptually uniform and are actually highly non-uniform. In order to transform XYZ into a uniform standard, two systems developed, L*u*v* and L*a*b*, also written CIELUV and CIELAB. L*u*v* and L*a*b* improve perceptual non-uniformity but require highly complex computations to accommodate real-time display.

In most cases, an initial factory calibration creates calibration tables that are used by the digital processing schemes to make the color reproduction devices conform to standards and to compensate for drift and other changes.

Various instruments and methods are used to calibrate devices for color reproduction, including densitometers and calorimeters. A densitometer measures the density of ink on a print patch in each of CMYK colorants. The densities are then compared to a scale of desired densities to produce calibration curves. The data from the calibration curves is used to correct the device so that it more closely resembles the scale data.

A calorimeter measures CIE values of color on a scale of printed patches in each of the CMYK print colorants. The measured CIE values are then compared with a corresponding scale of desired values to obtain calibration curves, which correct the device so that is more closely resembles the scale data.

In the field of desk top publishing, it is common to have a scanner device as part of the office equipment rather than a densitometer or colorimeter. It is therefore convenient to use the scanner to calibrate the printer. The state of the art describes using a scanner as a calibrating device, wherein the scanner scans a print target and measures the densities of ink deposited on the target. The system measures the densities or colorimetric values of the color samples generated by a printing device.

Although the scanner is more convenient that using the other calibration devices, the quality is usually lacking. Scanners operate on a linear sensitivity scale, not a logarithmic density scale. Based on scanner deficiencies, the tonal and spectral scanner outputs vary even when measuring the same colored object. Thus, not only would similar scanners produce different results, but the same scanner suffers from degradation of performance over time.

To accomplish calibration between a printer and scanner, a transform is used in a digital image processor that maps the color signals of the scanner to the printer color signals so that the color reproduction system reproduces the colors present of the original images. Often the transform is implemented by employing a three dimensional lookup table (LUT).

One method to calibrate a color reproduction system includes using the color scanner, a processor, and a color printer. This requires transforming the color space environments. A first color transform is used to convert the scanner color signals, such as RGB signals, into color signals in a device independent color space. The second transform is used to convert color signals from the device independent color space to printer color signals such as CMYK signals.

It is possible to combine the two transforms into one function implemented by the processor that directly converts scanner color signals into printer color signals. The transformations are typically implemented by storing calibration values in a three or four-dimensional LUT and using a linear interpolation method to interpolate between values in the lookup table.

A typical printer and scanner calibration involves printing a set of color patches on the printer, measuring the color patches using an optical instrument and using a mathematical method such as regression to derive the printer transform based on the measured data. The calibration continues by scanning a set of test patterns, measuring the test patterns using an optical instrument and employing a mathematical method such as regression to then derive the scanner transform.

There are ways to decrease the time required to calibrate, including using a smaller number of sample points. This creates a lookup table that is much smaller and easier to search during the mathematical manipulation, however the accuracy during interpolation is much lower.

Another prior art approach is to sample a cube in the printer color space. For example, an RGB cube in the printer color space may be uniformly sampled along the R, G and B axis to provide a discrete set of printer color coordinates which are stored in a computer. These color coordinates are provided to a printer that prints color patches corresponding to the specified color coordinates. The printed color patches are subsequently fed to a scanner and scanned to provide a set of scanner color coordinates that is a subset of the entire space of color coordinates of the scanner. Thus, a direct correspondence is obtained between the set of stored printer color coordinates and the set of scanned color coordinates.

The terms calibration, characterization and profiling are sometimes incorrectly used interchangeably. For purposes of this application, the terms are distinguished herein. Calibration refers to the process of deriving a transform by comparing a device output to some reference output and generating a lookup table. This is a device dependent process. Calibrating a device returns the device to some normalized, standard, and predictable state. Therefore, calibrating a monitor, a scanner or a printer alters the behavior of that device.

Profiling, also called characterizing or describing is really a description of the color capabilities of the device. Profiling measures the device properties and transforms the properties into some usable form as part of a color management system. Profiling does not change the behavior of that device as with calibration, but rather compliments the calibration. However, it does not preclude the need to calibrate individual devices to ensure that the process that created the characterization remains consistent.

Because some coloration inaccuracies are introduced when switching between different color spaces, and device profiling is useful to correct such inaccuracies. Device profiling measures the inaccuracies and corrects them in a device-independent color space (LAB). By working in the device independent LAB environment, improved color conversions between devices is possible.

To generate a profile, software is used to determine the device's full color range capabilities. The gamut of the device is determined by measuring the colorimetric values for a set of known color patches or targets. The measured data is then used to generate a custom profile for the device. The profiles are then applied to an image data to compensate for any transformation inaccuracies.

The International Color Consortium (ICC) created a standardized system for describing the color-rendering capabilities of any device. The ICC profile defines the gamut of the device, and a measure of the color distortion. The ICC profile actually has two components, the first element contains hardware data about the device, and the second element is the colorimetric device characterization data that defines the manner in which the device establishes color.

The profiles are used in conjunction with the other color-management engine and the application programs that use the profiles. The generic profiles provided by the manufacturer are often based on a perfectly calibrated device, and do not generally provide the accuracy required in modern systems. Therefore, custom profiles are utilized to enhance the factory profiles and provide more accurate color reproductions.

The purpose of profiling is to accurately define the reproducible and repeatable gamut of a device. This is accomplished by using a reference target on the device and measuring the device's reproduction values. Software is used to build a transform that maps scanner color space values to device independent color values. The transform is typically built by using a mathematical technique such as the least squares algorithm with the reference data and measured data.

A typical scanner profiling process involves scanning a reference target that has numerous color patches. IT8 is one such reference standard. Software is used to compare the color reference values that accompany the target with the measured values. The entire process is a comparison of reference data and measured data.

Some profiling packages only profile a scanner's raw color space while others create a corrective profile, wherein a scanner driver uses the ICC profiles of the device to incorporate the physical limitations of the device in the processing.

Printers are more difficult and time-consuming to profile because they do not emit light and require another device, properly calibrated, to measure the color data. The printer prints a target that contains the color patches. The printout is measured by a color measuring device, such as a spectrophotometer, and software uses the measured values to build a transform that maps device independent colors to the printer's color space. Various factors affect the printer color values, including paper stock, ink, temperature, and pressure, so other variable and calculations are required for processing.

The typical custom profile is produced by comparing measured color values against reference values. For example, a scanner profile is produced by scanning a color target, wherein the profiling application converts the scanned data into device independent values. The device independent values are compared to the CIE values for the reference target, and a custom profile is created to correct any deficiencies. The reference target is normally the industry-standard IT8 target that contains 264 color patches plus 24 shades of gray.

Printers are more difficult and time-consuming to profile because they do not emit light and require another device, properly calibrated, to measure the color data. The profiling software compares the measured data to the target values and produces the correction data. By comparing the measured colors with the color values, a custom profile is developed.

A color management system comprises interconnected devices such as a scanner, monitor, printer, and computer, with a software application that handles the color reproduction between the application and various color devices. The system interacts with the processing means and the memory means of the system to control the devices, process transformations, and store data. The software performs the color transformations to exchange accurate color between diverse devices, in various color coding systems including RGB, CMYK and CIEL*a*b*. In theory, the color management system evaluates capabilities of the system and devices and determines the appropriate color device and color space. However present systems have significant difficulties implementing such a system in a commercially feasible manner.

There have been various attempts at creating cost-effective and quality color calibration systems that address the aforementioned problems. One such system describes a closed loop system that calibrates a scanner to a printer. The calibration profile created by the system resides in the scan driver so the scanned images are pre-calibrated for the specified printer. The calibration profile is created by the following steps:
1. The scan driver creates an image with color patches.
2. This image is passed through the printer path until the color patches are printed.
3. These color patches are scanned by the scanner.
4. The system builds a profile that maps desired RGB values to RGB values that when printed will actually produce the desired RGB values.
5. This profile is then applied to all images scanned for the desired printer.

This calibration scheme has the disadvantage of forcing the user to work with images that are calibrated for a particular printer. For correct screen viewing the images must be translated from printer space to monitor space. Images that were scanned for one printer will not work with another printer, as the data is device dependent. Even images scanned for the same printer will become incompatible if the paper type, ink type, or some other variable is changed.

There are additional problems with the system. The scanner is not profiled, and as known in the industry, quality results require that the scanner be properly profiled. Also, the color space of the printer is not RGB, and printers often have poor internal profiles that result in the printing of RGB images that look very poor on the screen.

The present invention is distinguishable because it profiles both the scanner and the printer individually and is not truly a closed loop system. The present system produces two profiles: a scanner profile and a printer profile. Both profiles translate to and from a device independent color space, thus images from the scanner are independent of any device that is attached to the printer and images that go to the printer are independent of the printer. Images from the scanner can be printed on many different printers and images from many sources can be printed on the printer.

Another system known in the art describes a closed loop system where the scanner output is mapped to a printer input. The primary difference is in the implementation details, but suffers from the same inherent problems as the other prior system. The steps of the this system include:
1. Determine the relationship between equal printer color signals and averaged scanner color signals.
2. Produce a set of color patches uniformly distributed in scanner color space on the printer.
3. Scan the patches with the scanner.
4. Produce a look-up table from printer to scanner.
5. Invert the look-up table to go from scanner to printer.

Another existing system uses a scanner and printer to calibrate the path from the scanner to the printer. It includes non-linear interpolation and gamut mapping techniques. As with the other prior systems, it does not solve the problem of accurately calibrating the scanner that would likely result in color reproduction problems.

A further color matching system known in the art uses a device independent color space to map colors from one device to another under different viewing conditions. Similar systems are common and supported by the industry standard ICC specification.

Another system that calibrates a printer by using the scanner as a densitometer is known in the art. The scanner is used as a densitomiter by scanning an image with known densities and building a look-up table that translates RGB values to density. Patches composed of separate inks at different levels are printed and measured by the scanner. These measurements are then used to calibrate the printer. This system does not actually characterize a printer but uses the scanner to return a printer to a known state so a pre-built table will function correctly—a calibration function.

In distinction, the system of the present invention uses the data from the scanner to actually build the types of tables that accurately reproduce the color values. A simultaneous scanning method is used, wherein the printed calibration image and the gray scale test strip are scanned simultaneously to overcome scan to scan error and to reduce the number of user steps in the calibration process. While the patches measured by the prior system can only be used to re-calibrate the devices, the present invention techniques can fully characterize the devices.

Yet a further system known in the art is a method of adjusting the calibrations of a scanner and a printer by scanning in calibration images and comparing the scanned data to previous data. In this known embodiment, the system first scans a calibration target with known color values, compares the scanned values with the known values and produces calibration data. Then it prints calibration patches, scans the patches, and compares the scanned patches to previously printed patches and produces calibration data. Finally, it combines the two sets of calibration data to produce data that calibrates both the printer and scanner. A difference between this system and the present invention is that the prior system compares calibration data when calibrating a printer. The present system produces a printer profile by understanding how the printer produces a particular color and then building a table that allows that color to be printed. The prior system also has no simultaneous scanning or compensation table.

There are some commercial products have tried to alleviate the aforementioned problems. One company displayed color calibration system that uses the combination of a color measurement device such as a spectrophotometer and a scanner to calibrate a printer. With this system, color patches were first printed with a printer. A very small number of the patches were then read with the measurement device and then the entire set of patches was read with the scanner. The patches that were read with the measurement device and the scanner was used to calibrate the scanner and the calibration of the scanner was then used to modify the entire patch set so that a printer calibration could be made. This system has the advantage of calibrating the scanner and printer with just one scan and also calibrating the scanner to the printer. However, the system also requires the use of an expensive measurement device and has the disadvantage of calibrating the scanner only to the printer, not with more common photographic materials or reflective works.

Providing efficient and accurate color reproduction remains a problem because of numerous difficulties described herein. What is needed is a practical and simple means to produce a printer profile. There should be a color reproduction system that provides reproduced colors that match the original colors. This system would provide color matching to be performed between a scanner and a printer without the use of expensive additional photometric equipment such as a spectrophotometer. The profiling results should be device independent so that the equipment can be substituted. The profiling should also be preformed in a single step to reduce the time required for profiling and to avoid any scanner-setting errors.

BRIEF SUMMARY OF THE INVENTION

The present invention is to provide a color reproduction system that addresses the aforementioned problems. The present invention produces accurate printer ICC profiles from a scanner. The present system also produces a scanner ICC profile however the scanner profile is not a requirement of the invention. A scanner profile is created that can be used to process images intended for any output device. A printer profile is created that can be used to print images from any source. Using a scanner compensation table allows any scanner to function more closely to a spectrophotometer and ensures more accurate color data collection than can normally be obtained from a scanner.

Another feature of the invention is to scan the scanner calibration target at the same time as the printer calibration target, and use these targets to fully calibrate both the scanner and printer. Scanning both targets simultaneously significantly reduces scanner-setting errors, ensures the color data in both targets is measured under identical conditions, and decreases the profiling process.

Another aspect of the invention is the compensation color transform that improves the quality of the color reading produced by the scanner. The compensation transform compensates for the difference between how a scanner scans a photographic target and how it scans a printed target. Photographic and printed materials all have unique spectral properties that a scanner is sensitive to and can measure. The differences between photographic and printed materials are often large enough to cause a scanner that has been properly calibrated for photographic material to misread printed material. The algorithms of the present invention map the same RGB value from a scanner to different CIEL*a*b* values when the RGB values come from patches with different ink values.

One embodiment of the invention is a scanner system comprising a physical scanner, scanner driver software, scanner ICC profile, central processing unit (CPU), storage means, monitor, printer, printer driver, printer ICC profile, profiling application, sets of compensation transforms, an IT8 photographic target, and a print target printed by the printer, wherein the scanner ICC profile is produced by the compensation transforms. The print target and photograph target are scanned simultaneously and the profiling algorithms calculate accurate printer ICC profiles.

Another embodiment of the present invention is a method of profiling, comprising the steps of printing a print target, placing and IT8 Q60 scanner target onto the print target to produce a combined target, scanning the combined target, processing the scanner data to produce a scanner ICC profile, processing the printer data to produce device independent color values, selecting a compensation transform, and building a printer ICC profile.

An additional aspect is the generation of a scanner profile that can be used to process images intended for any output device. Furthermore, a printer profile is created that can be used to print images from any source.

Yet another feature is the use of a scanner compensation table that allows any scanner to function more closely to a spectrophotometer and ensures more accurate color data collection than can normally be obtained from a scanner.

Yet a further embodiment of the invention includes scanning both the reference target and the print target simultaneously thereby reducing scanner-setting errors and ensuring the color data in both targets is measured under identical conditions. Scanning simultaneously, these targets can be used to fully calibrate both the scanner and printer.

Another feature of the invention is a method of creating a compensation transform that uses the least squares algorithm to solve the equation y=Ax where x is an array of CIELAB values from the calibrated scanner, y is an array of compensated CIELAB values, and A is a matrix that transforms between x and y. The x array currently contains non-linear combinations of the CIELAB values. The array x is defined as:

$x[0]=L$
$x[1]=a$
$x[2]=b$
$x[3]=L^2$
$x[4]=a^2$
$x[5]=b^2$
$x[6]=La$
$x[7]=Lb$
$x[8]=ab$
$x[9]=L^3$
$x[10]=L^2a$;
$x[11]=L^2b$;
$x[12]=La^2$;
$x[13]=Lab$;
$x[14]=Lb^2$;
$x[15]=a^3$;
$x[16]=a^2b$
$x[17]=ab^2$;
$x[18]=b^3$;

The matrix A can be computed by using the calibrated scanner and spectrophotometer data with the least-squares algorithm.

Another method involves creating the compensation table that takes into account the fact that scanners read different inks and paper types differently. A printer with more than three inks is generally capable of printing exactly the same color with more than one different combinations of ink. Unfortunately, these different ink combinations may not be read the same by a scanner because of the spectral differences of the inks. In addition, the scanner can see different colors as the same because of the differences in the inks. This embodiment of the compensation transform uses different transforms for different combinations of inks and takes advantage of the fact that the ink values for each patch in the print target are known.

A further aspect is to provide a color reproduction system suitable for the graphic arts, such as printings, sign making, and color correction and also for medical imaging, and color imaging applications.

An additional embodiment is a method of profiling a color printer using a scanner comprising the steps of printing a print target on said color printer, placing a reference target onto the print target to produce a combined target, and scanning the combined target on the scanner to produce a scanned image. The scanned image comprises reference target data and print target data. Processing the reference target data produces a scanner profile, and processing the print target data with the scanner profile produces an uncompensated printer profile data. The next step requires adjusting the uncompensated printer profile data using a compensation transform. Finally, building a printer profile and storing the printer profile.

A further feature includes the printing performed without using a printer profile so a full gamut is achieved. In addition, the reference target can be IT8. Yet a further aspect is where the compensation transform is processed using the least squares algorithm.

An additional aspect includes wherein the compensation transform compensates for ink differences, and in particular, to produce the compensation transform. A further aspect compensates for paper differences. One aspect includes manually cropping the combined target or automatic cropping of the combined target. A further aspect is for inputting data for the compensation transform, wherein such data represents the user's device type, paper type and/or ink type. Another aspect is wherein the uncompensated printer profile data is expressed as device independent colors pace values.

One embodiment of the invention is a method of producing compensation transforms comprising the steps of generating a plurality of color reference patches, scanning the patches to produce scanned color space values, measuring the patches with an optical measuring device to produce measured color space values, and creating a compensation table from the scanned color space values and the measured color space values. Another aspect includes wherein the compensation transform for CMYK inks with linear interpolation is processed using the formula $y=af_0(x)+(1-a)f_1(x)$. The optical measuring device may be a spectrophotometer.

Another embodiment of the invention is for a color profiling system for producing a device independent printer profile comprising a printer section having a printer driver and a printer device, wherein the printer device prints a print target. There is a scanner section that includes a scanner driver and a scanner device. A combined target is generated with the print target and a reference target, wherein the combined target is scanned by the scanner device to produce a combined target data. There is a processing section for processing the combined target data, wherein the processing section produces a scanner profile and uncompensated printer color patch readings in device independent color space values. There is a compensation transform module for transforming the uncompensated printer color patch readings into compensated printer color patch readings, and a processing section for processing the compensated printer color patch readings into a printer profile.

Still other features, objects and advantages of the present invention will become readily apparent to those skilled in this art from the following detailed description, wherein only one embodiment of the invention is described, simply by way of illustration for carrying out the invention. As will be realized, the invention is capable of other and different embodiments, and its several details are capable of modifications in various obvious respects, all without departing from the invention. Moreover, it should be noted that the language used in the specification has been principally selected for readability and instructional purposes, and not to limit the scope of the inventive subject matter.

BRIEF DESCRIPTION OF THE DRAWINGS

The present invention will be readily understood by the following detailed description in conjunction with the accompanying drawings, wherein like reference numerals designate like structural elements, and in which:

FIG. 3(*b*) is a flow chart of the profiling process.

DETAILED DESCRIPTION OF THE INVENTION

Figure 1:
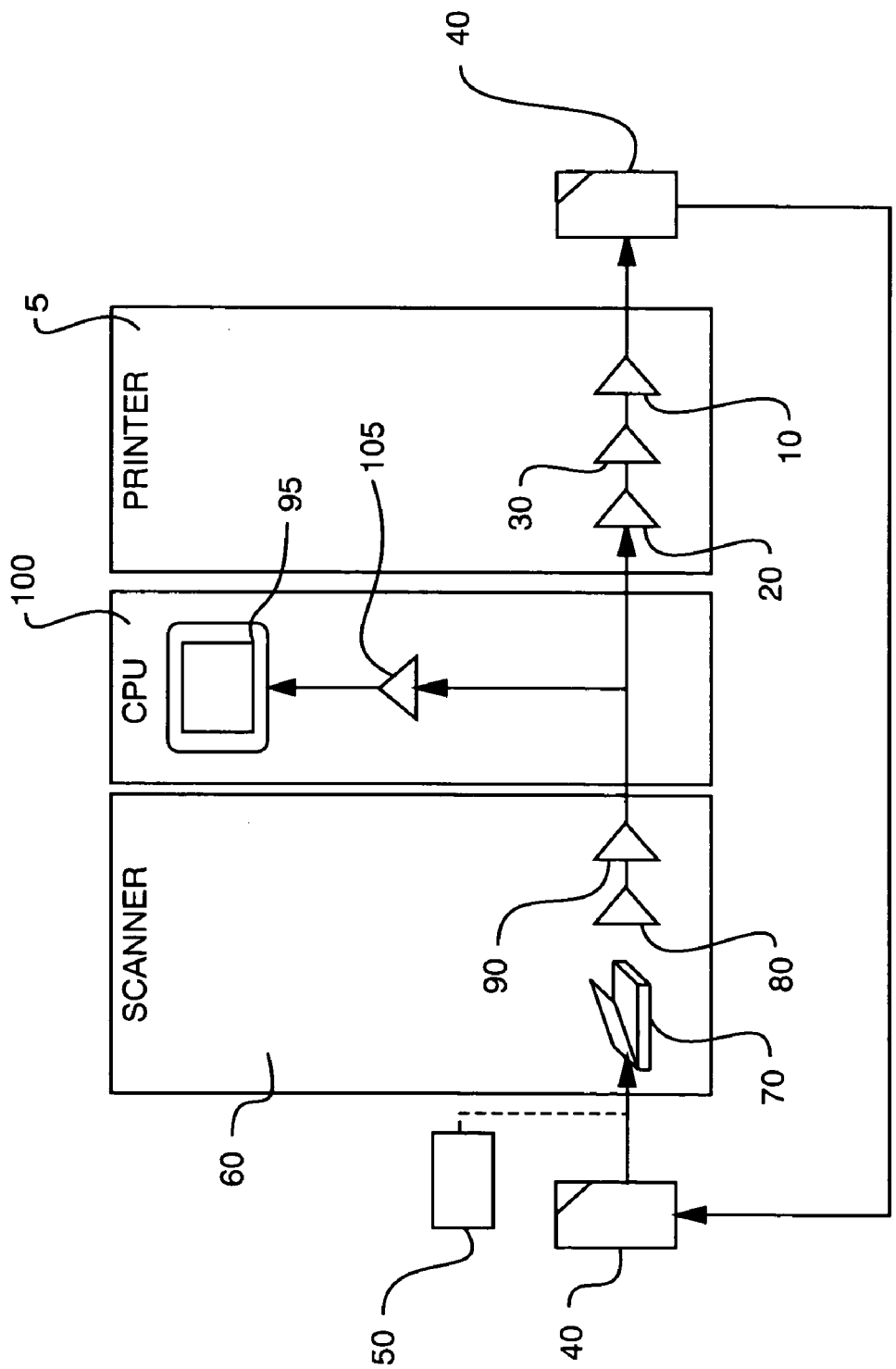
FIG. 1 is a block diagram illustrating a prior art profiling system.

A prior art profiling system is illustrated in FIG. 1, having a printer section 5 containing a printer 10, an associated printer driver program 20 and a printer ICC profile 30. The printer driver 20 is the interface between the user and the printer section 5, and has the software commands to control the printer 10. The printer ICC profile 30 contains data and information that is used by the digital processing schemes to make the color reproductions. A scanner section 60 has a scanner device 70, a scanner driver 80, and a scanner ICC profile 90. The computer or CPU 100 is the processing and memory means for the system and is interconnected to the various components, which may include any number of image source devices such as a digital camera, internet access, DVD, and CD-ROM. A monitor 95 provides the visual interface to the user and a monitor ICC profile 105 provides the color correction for the display.

In a prior art operation, the CPU 100 sends a print instruction to the print driver 20 that represents the color print target 40. The print driver 20 issues the print command for the color print target 40, wherein the RGB data representing the print target is altered by the printer ICC profile 30, and the corrected print target 40 is printed by the printer 10 as the output image.

The scanner 70 scans the print target 40, to produce a digitized print target image. The digitized print target image goes through the scanner driver 80 and the RGB digital data is altered by the scanner ICC profile 90. The corrected digital print target data is then processed by the CPU 100 wherein a software application compares the color space values of the print target data to the color space values some reference target. Based on this comparison, device dependent correction profile data is calculated and stored and used as the printer ICC profile 30 for all further printouts by the printer 10.

Scanner calibration is accomplished by scanning a reference print target 50 with the scanner 70. The digitized reference target image goes through the scanner driver 80 and the RGB reference target digital data is altered by the scanner ICC profile 90 to account for scanner errors. The corrected reference target digital data is then processed by the CPU 100 wherein a software application compares the color space values of the scanned reference target data to the color space values of the reference target that accompany the reference target and are usually obtained in a factory setting using a spectrophotometer. Based on this comparison, device dependent correction profile data is calculated and stored to customize the scanner ICC profile for all future scanning by the scanner 70.

Figure 2:
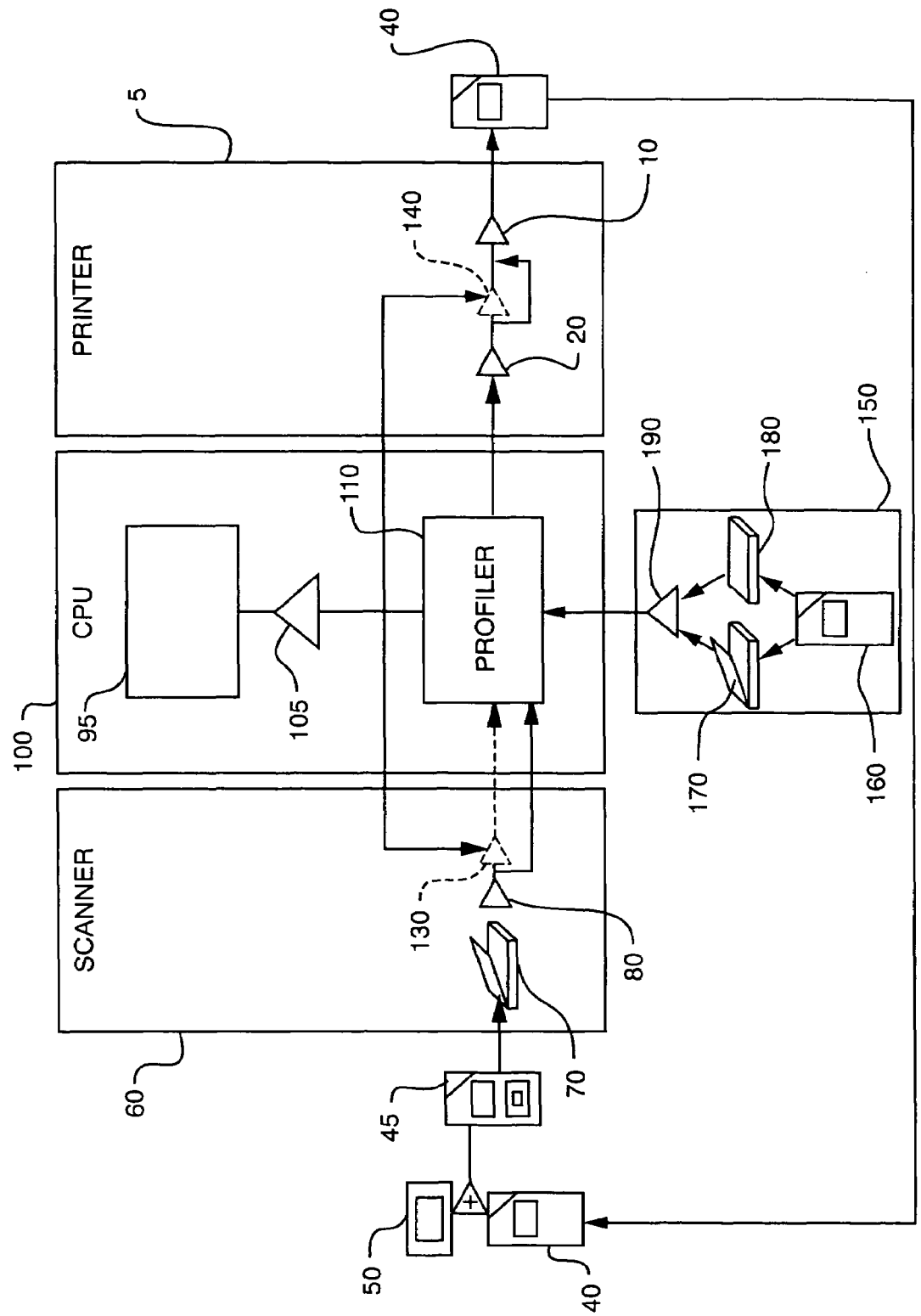
FIG. 2 is a block diagram of a present invention profiling system.

A representation of the profiling system of the present invention is illustrated in FIG. 2. Printer section 5 contains a printer 10 with an associated printer driver program 20. The printer driver 20 is the interface between the user and the printer 10, and has the software commands to control the printer 10. In the profiling system, the printer ICC profile 140 is bypassed to produce a raw printout.

The central processing unit (CPU) or computer 100 is interconnected with the printer section 5. The profiler 110 is a software program resident in the computer 100 and communicates with the printer 10 through the print driver 20 to produce a color print target 40, without profiling. The print target 40 is typically a set of color patches, and is oriented onto the same page 45 as the reference target 50. In one embodiment the reference target 50 is attached to the lower half of the page 45 with tape. Other locations and securing means are well within the scope, of the invention. The reference target 50 is a predetermined standard that comes with color space values, and is used in conjunction with the profiling software 110 to create a scanner ICC profile 130 as well as provide the reference for the printer ICC profile 140.

The scanner section 60 contains the scanner assembly 70, and the scanner driver 80. The combination of the scanner 70 and the scanner driver software 80 produce an RGB image of the image that is scanned. As shown, the combined reference target 50 and the print target 40 are scanned simultaneously to produce an RGB image that is processed by the profiling software 110. The combined image may be cropped on the monitor 95 manually, or it may be automatically cropped to isolate the two images from the single scanned image. The profiler 110 processes the reference target data to produce the scanner ICC profile 130.

The print target data is processed by the profiler 110 using the scanner ICC profile 130 to produce uncompensated color space values. The profiling software 110 processes the uncompensated print target data using compensation transforms 150. Compensation transforms 150 are created for a scanner by using print targets 160 on various types of paper, and varying inks to assemble a list of different print possibilities. The print targets 160 are measured by optical instruments 180 such as a spectrophotometer and also scanned by a scanner 170 to produce tables 190 for the various inks and paper types.

The profiler 110 produces a new scanner ICC profile 130 and a new printer ICC profile 140 to produce accurate print reproductions. The printer ICC profile 140 is communicated is stored and utilized by the printer section 5. The scanner ICC profile 130 is stored and used by the scanner section 60 to produce accurate reproductions.

Figure 3A:
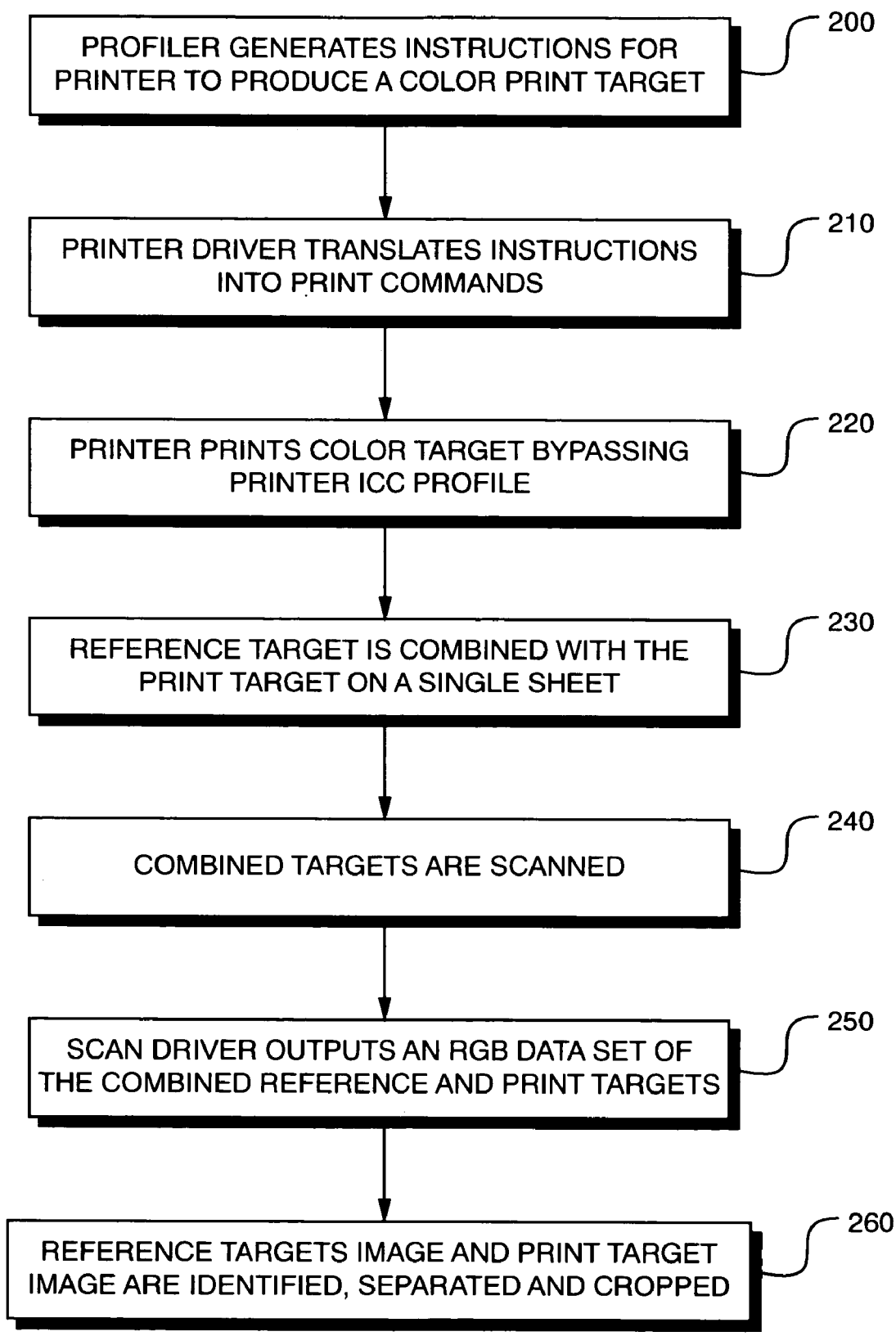
FIG. 3(*a*) is a flow chart of the profiling process.
Figure 3B:
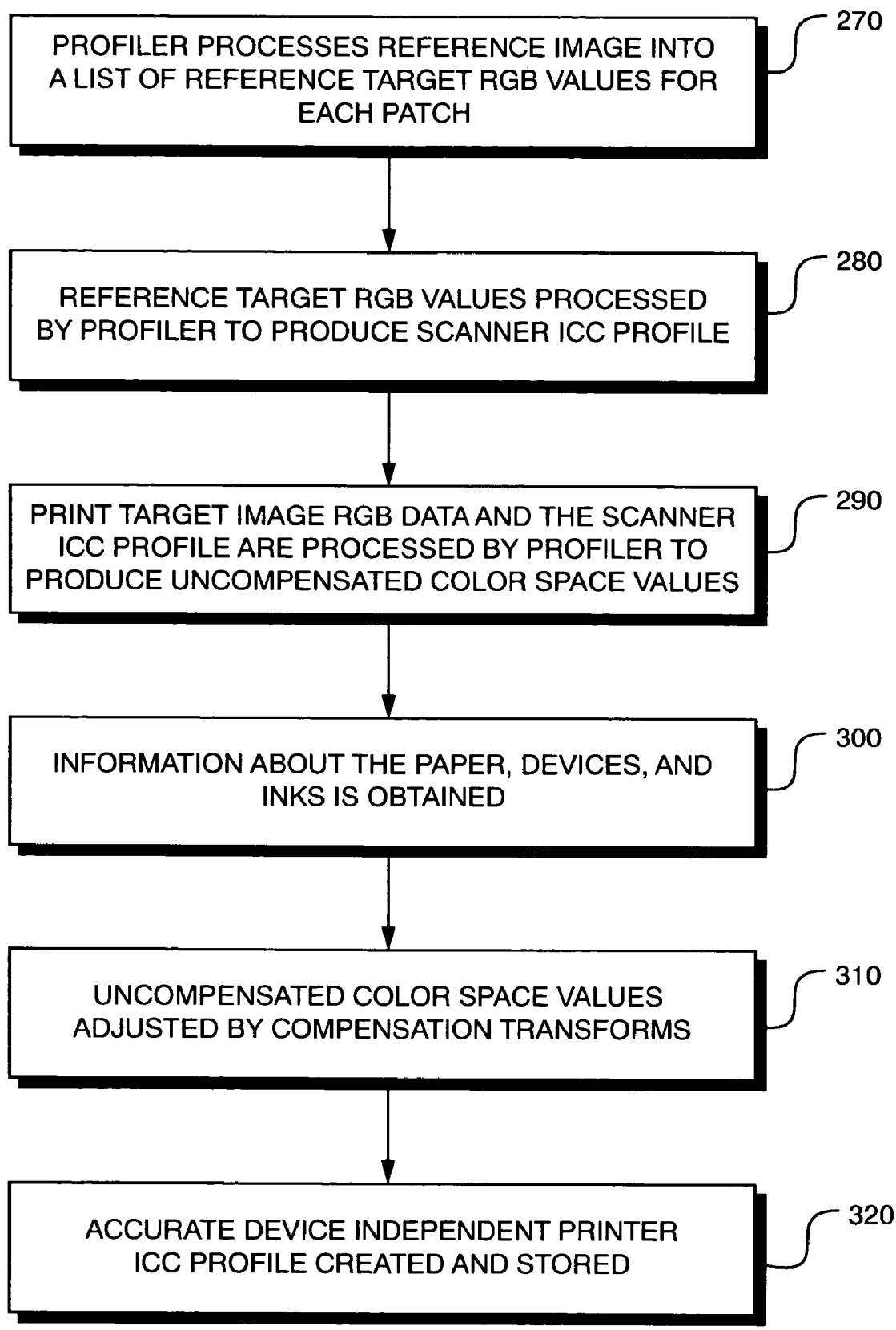

The steps of the present invention are depicted in FIG. 3(a) and FIG. 3(b). In the first step 200, the profiler generates an instruction set for a set of color print patches for the print target. These print patches provide a representation of the entire color space of the printer. For an RGB printer, the patches might contain every possible combination of red, green, and blue where the red, green, and blue inks can only have the values of 0, 32, 64, 128, 160, 192, 224, or 256. Such a patch set would have 512 patches.

The instruction set for these patches are passed to the print driver in the next step 210, and then sent directly to the printer for printing the target 220. In one embodiment the printer driver translates the instruction set into print commands and issues them to the printer with no color correction or profiling. The print target can be printed with no profiling because the present system replaces the profiles, and because most profiles reduce the color gamut that a printer can print. A profile built on top of such a profile is inferior to a profile built without such a profile.

There are certain situations in which a profile can not be bypassed, such as when printing occurs through the standard print driver of an inexpensive home printer. Most of these printers use CMYK inks, but the print drivers are RGB. The RGB to CMYK transform is a profile that can not be avoided. In other cases, a built-in profile might produce better results because of some non linearity of the printer that can not be captured by the print target.

In the next step 230, the print target and the reference target are placed on the same sheet. In one embodiment an IT8 reference target is taped to the lower portion of the print target sheet. Combining the targets prevents many significant scanner setting problems (such as auto white balancing) from damaging the readings. The reference target has an associated data file that specifies the CIEL*a*b* values of its color patches which are obtained in a factory setting.

The combination of the reference target and the print target on single sheet of paper is scanned by the scanner 240 and a data set of the combined reference target and print target is generated. Next, 250 the scanner output data set passes through the scan driver resulting in an output that is an RGB image with the combined targets.

The reference target and the print target are located and identified from the single image 260. In one embodiment the two targets are cropped either manually or automatically. Manual cropping is accomplished by displaying the image on the monitor, wherein the user places crop points on each of the corners of the reference target and the print target. Automatic cropping uses a software algorithm to identify the respective targets. With proper alignment and standardization, it is possible to eliminate cropping by having the locations of the targets predefined.

The reference target image is processed in step 270 to produce a list of reference target RGB values for each patch. The reference RGB values are processed by the profiler to build a scanner ICC profile 280. This scanner ICC profile allows images to be scanned very accurately by the scanner. However this is not the only purpose of the scanner ICC profile.

The scanner ICC profile is also processed with the printer RGB values in step 290 to produce uncompensated CIEL*a*b* values. The transform that was used to create the scanner ICC profile may also be used. In large part, these CIEL*a*b* values are now independent of individual differences between scanners. Any errors in the data are common to most scanners.

In order to adjust the uncompensated values, information about the paper, inks, and possibly even the device are required. This is one of the elements that distinguish the present invention. Although there are some systems that perform profiling functions, none of the prior systems utilize information about the paper, inks or device types in the profiling, and this information allows the present system to produce highly accurate scanning.

The compensation color transform improves the quality of the color reading produced by the scanner. For example, the algorithms of the present invention map the same RGB value from a scanner to different CIEL*a*b* values when the RGB values come from patches with different ink values. Compensation transforms are created by generating print targets on various types of paper, varying inks, and possibly even various devices to assemble a list of different print possibilities. The print targets are measured by optical instruments such as a spectrophotometer and also scanned by the scanner to produce tables that are used as part of the compensation transform.

The input for the paper type or ink may be predefined or a user can input the information. The compensation transform is applied to the uncompensated CIEL*a*b* values 300. The compensation transform compensates for the errors that are common to how most scanners read the particular ink and paper combination being used. Since different ink and paper combinations cause different errors, compensation transforms address this problem.

Once the user selects the properties of the printer such as the inks and paper type, the compensation transform adjusts the uncompensated CIEL*a*b values 310. And finally, 310 the compensated CIEL*a*b* values are used by the profiler to build a printer ICC profile which is stored and used by the printer. If the compensation table has correctly compensated for the scanner errors, the printer profile will be almost as accurate as a profile created using a spectrophotometer.

The compensation transforms are typically created at the factory by printing print targets using many combinations of paper, inks, and printers. Each print target is read by a spectrophotometer or similar device and scanned by a calibrated scanner. The data from the spectrophotometer and the calibrated scanner is combined to form the tables for the compensation transform.

In the present invention, compensation transforms are created and are applied to the uncompensated CIEL*a*b data that results from processing of the print RGB data with the scanner ICC profile. Although there are various methods, two methods of creating the compensation transform are described herein.

A first method of creating the compensation transform for the present invention uses the least squares algorithm to solve the equation y=Ax where x is an array of CIELAB values from the calibrated scanner, y is an array of compensated CIELAB values, and A is a matrix that transforms between x and y. The x array currently contains non-linear combinations of the CIELAB values. The array x is defined as:

$x[0]=L$
$x[1]=a$
$x[2]=b$
$x[3]=L^2$
$x[4]=a^2$
$x[5]=b^2$
$x[6]=La$
$x[7]=Lb$
$x[8]=ab$
$x[9]=L^3$
$x[10]=L^2a$
$x[11]=L^2b$
$x[12]=La^2$
$x[13]=Lab$
$x[14]=Lb^2$
$x[15]=a^3$
$x[16]=a^2b$
$x[17]=ab^2$
$x[18]=b^3$

The matrix A is computed by using the calibrated scanner and spectrophotometer data with the least-squares algorithm. Although least-squares algorithms are well known in the industry, the implementation of the algorithm at this juncture of the process is unique.

The second method of creating the compensation table is more complex, and takes into account the fact that scanners read different inks in a different manner. A printer with more than three inks is generally capable of printing exactly the same color with more than one different combinations of ink. Unfortunately, these different ink combinations may not be properly read by a scanner because of the spectral differences of the inks. In addition, the scanner can read different colors as the same because of the differences in the inks. The transform that uses the equation y=Ax could therefore never produce accurate results since two identical input values would need to produce two different output values.

Figure 4:
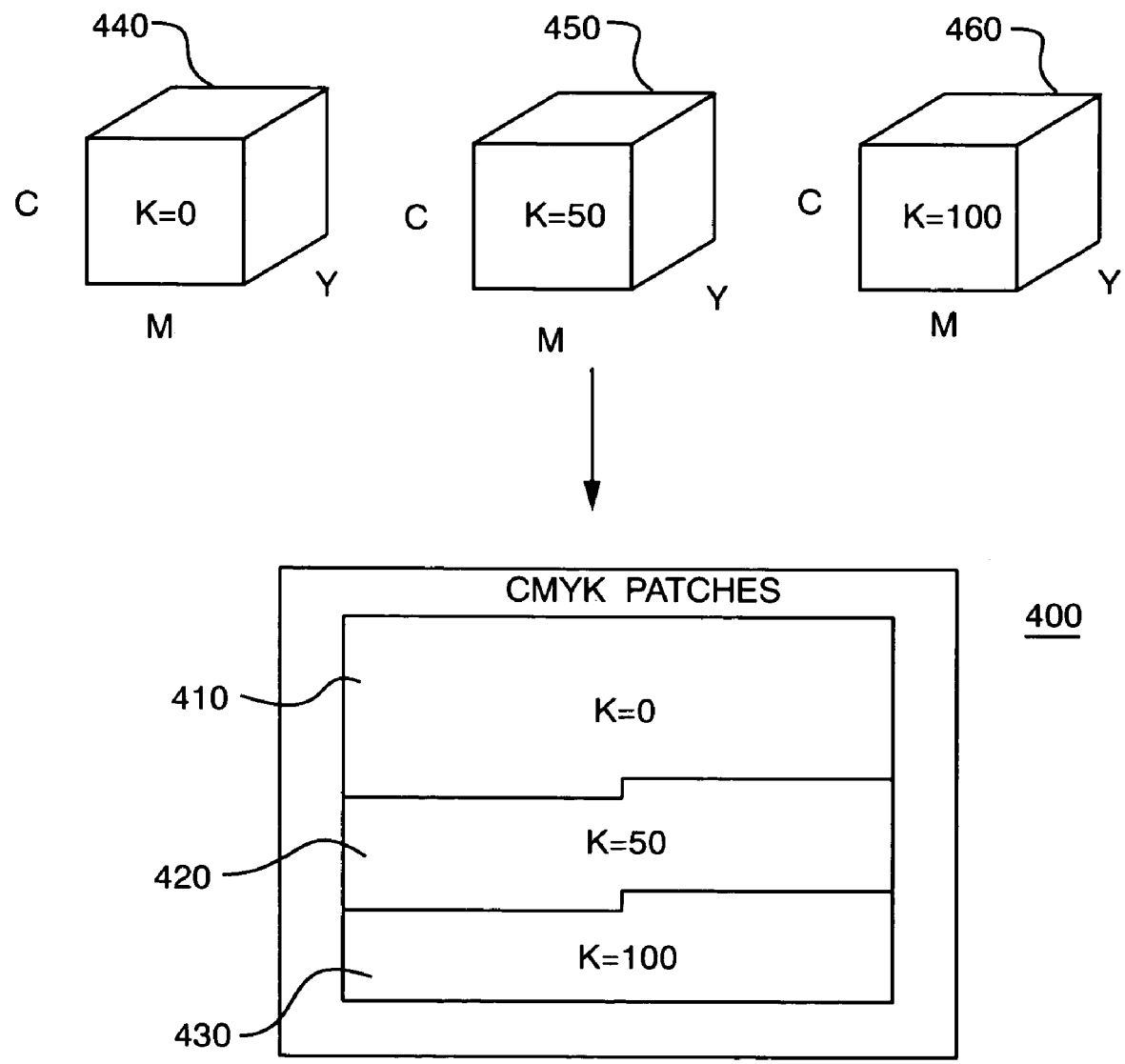
FIG. 4 shows reference patches generated for a CMYK device.

A second embodiment of the compensation transform solves the problem by using different transforms for different combinations of inks. This embodiment takes advantage of the fact that the ink values for each patch in the print target are known. FIG. 4 illustrates how the reference patches are generated for a CMYK device, although the invention works with other color spaces. When the reference print patches at the factory are created, the patch sets are composed of cubes of the primary inks (typically CMY). The reference CMYK print patch 400 is printed for a K=0 patch 410, a K=50 patch 420, and a K=100 patch 430. Each additional ink has a set of cubes associated with it. In FIG. 4, black has three cubes for the three values of black to be used in the patches. Additional inks beyond black would require the use of cubes for black, the additional ink, and combinations of black and the additional ink.

For each value of K in the patches (three values are illustrated 410, 420, and 430), all combinations of CMY at certain step sizes are included. These combinations of CMY patches form CMY cubes 440, 450, and 460. If a CMY cube has step sizes of 0 and 100, the CMY patches in the cube would be (0,0,0), (0,0,100), (0,100,0), (0,100,100), (100, 0, 0), (100, 0, 100), (100, 100, 0), and (100,100, 100). The CMYK patches that are printed are organized into groups that correspond to the different levels of K. Each group has the same K value and the CMY values from the CMY cube.

For each of the cubes in the reference print patches, a compensation transform is created. When the compensation is being performed, CIEL*a*b* values from the scanned print patches are run through the multiple transforms. The final output value is then calculated by interpolating the output of the transforms based on the original ink values used to create the print patches. For an implementation for CMYK inks that uses linear interpolation, the equation of the transform in this embodiment could be expressed as:

$$y = af_0(x) + (1-a)f_1(x)$$

where y is the compensated output, x is the uncompensated input, $f_0(x)$ is the transform for the first K cube, $f_1(x)$ is the transform for the second K cube, and a is a scaling factor determined by the print patch K value that indicates where the ink value is between the ink values for the first and second transform. The equation for a is:

$$a = (k-k_0)/(k_1-k_0)$$

where k is the K value for the scanned print patch, $k_0$ is the K value for the first transform, and $k_1$ is the K value for the second transform. Note that only the transforms just above and just below the scanned print patch K value are used.

Figure 5:
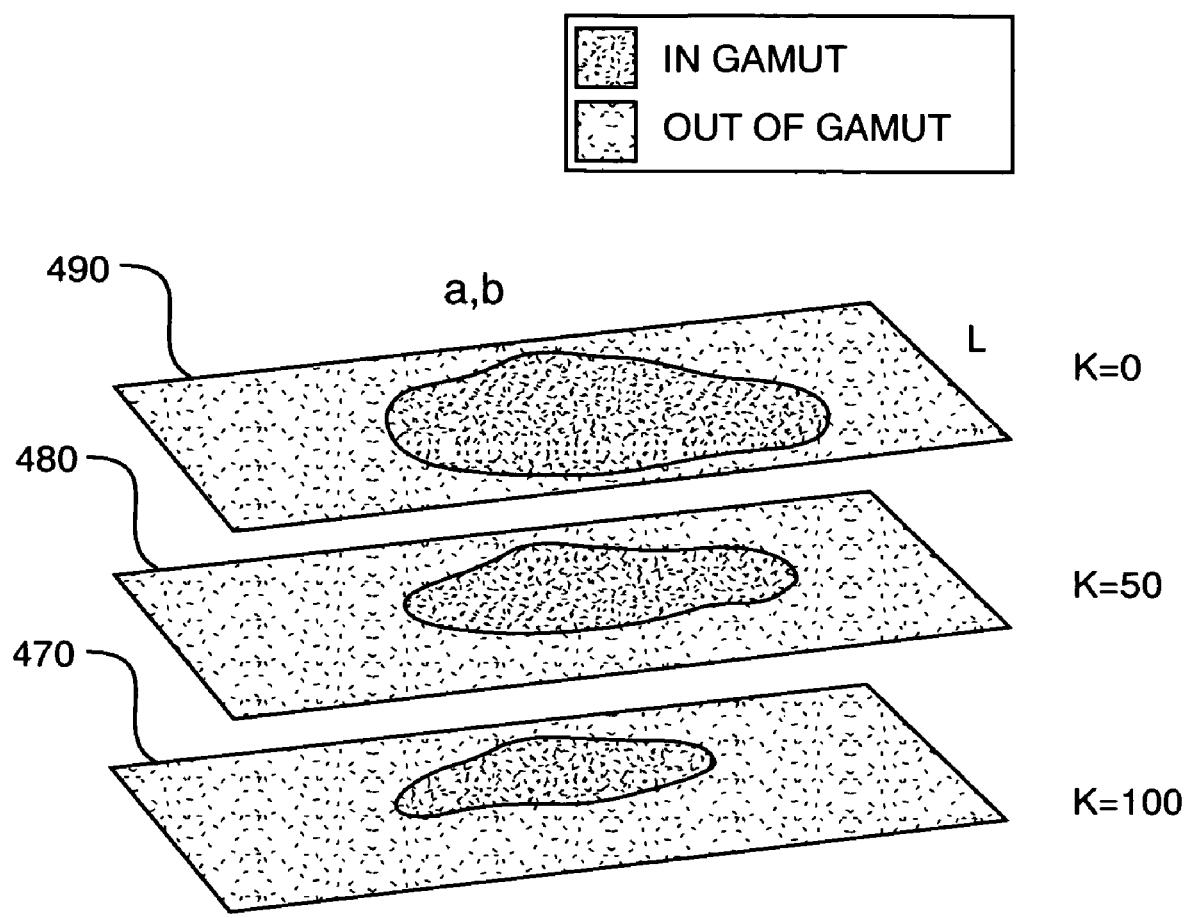
FIG. 5 depicts the building of the compensation transforms.

As illustrated in FIG. 5, the CIEL*a*b values can be represented as a slice for each value of K. The in gamut and out of gamut regions are shown for K=100 (470), K=50 (480) and K=0 (490). The compensation transforms are built in two stages. The first stage is to build the in gamut parts of the transforms. The in gamut parts are those CIEL*a*b* values that are in the color gamut of the printer for the ink values of the transform. As illustrated, the gamut is smaller when more K is added, as represented in the larger in gamut at K=0.

For the purpose of explaining the invention more clearly, it will now be assumed that the transform takes the form of a three-dimensional look up table (3D LUT). The 3D LUT maps scanned uncompensated CIEL*a*b* values to compensated CIEL*a*b* values.

Figure 6A:
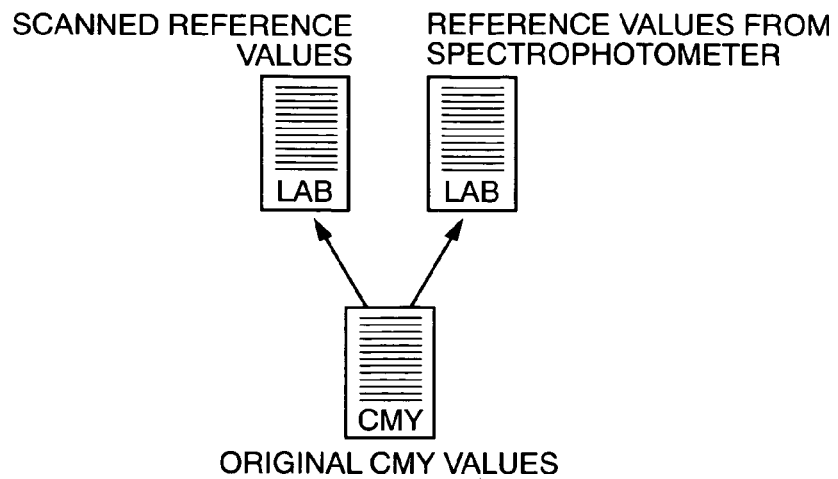
FIGS. 6(*a*)(*b*)(*c*) shows the process used to fill in the table.

The in gamut part of the 3D LUT is built by first filling in the in gamut parts of the table. The process used to fill in the table is illustrated in FIGS. 6(a), (b) and (c), and for illustrative purposes the CMYK color space is utilized. Each patch in the printer reference target is created with a unique CMYK value. For any transform, the patches in its cube all have unique CMY values and the same K value. When these patches are read by a scanner and a spectrophotometer, each CMY is matched to a scanned CIEL*a*b* value and a CIEL*a*b* value from a spectrophotometer. This matching is used to build a forward transform from the CMY values to the CIEL*a*b* values as shown in FIG. 6(a).

Figure 6B:
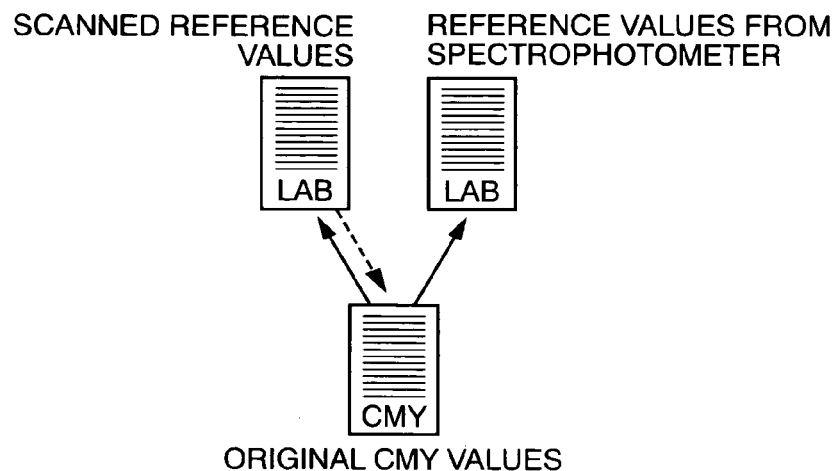
Figure 6C:
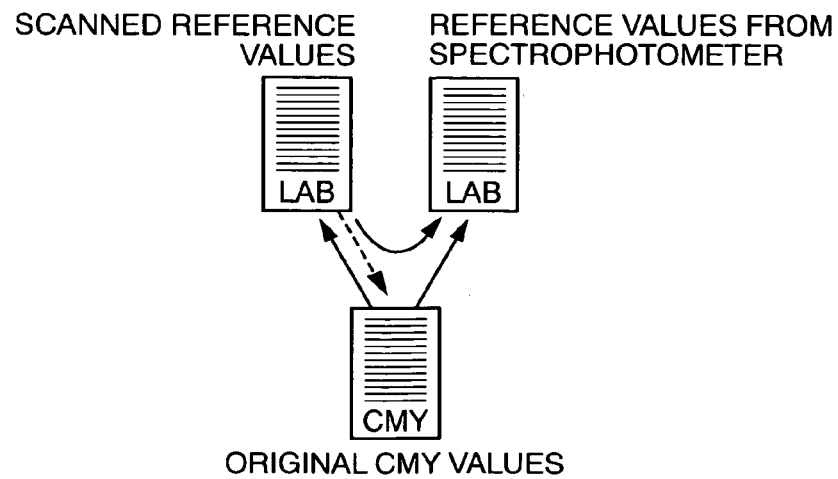

The forward table from CMY to scanned CIEL*a*b* values is inverted to produce a CIEL*a*b* to CMY transform in FIG. 6(b). When this inverted transform is combined with the forward CMY to spectrophotometer CIEL*a*b* transform, a scanner to spectrophotometer transform results as shown in FIG. 6(c). This transform is used to fill in all of the in gamut parts of the 3D LUT.

The out of gamut parts of the 3D LUT are filled in by using the in gamut data points in the current transform combined with the in gamut points from other transforms. These data points are used with, for example, the least squares algorithm, to build a set of transforms. Least square transforms used near in gamut LUT points primarily use points from the current ink value 3D LUT. Least square transforms used far away from in gamut points use more data points from other ink value 3D LUTs. When all of the data points of the 3D LUT have been filled in, all of the out of gamut points are smoothed. Smoothing the points ensures that the in gamut and out of gamut points match, and there are various smoothing algorithms available for smoothing.

Once the compensation tables are generated, the information is made available to the profiling system to adjust the uncompensated CIEL*a*b values. The compensation tables can be provided to the user as a software package or downloadable from the Internet.

It is well within the scope of the invention to incorporate varying color spaces and image sources. The present invention has been particularly shown and described with respect to certain embodiments of features. However, it should be readily apparent to those of ordinary skill in the art that various changes and modifications in form and details may be made without departing from the spirit and scope of the invention. Additional objects and advantages of the present invention may be further realized and attained by means of the instrumentalities and combinations all within the scope of the claims. The drawings and description are to be regarded as illustrative in nature, and not as restrictive The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of producing color compensation transforms comprising the steps of:
   using a calibrated scanner to scan at least a first color reference patch and a second color reference patch to produce corresponding first and second scanned color space values, respectively, wherein the first and second color reference patches exhibit respective first and second material compositions that are sufficiently different, one from the other, as to prevent a scanner, calibrated to the first material composition, from producing scanned color space values of as high a degree of accuracy with respect to scannable objects exhibiting at least the second material composition; and
   combining said first and second scanned color space values with at least the first and second measured color space values to create a compensation table, the first and second measured color space values being a result of the first and second color reference patches having been measured with an optical measuring device;
   wherein said compensation table is selectively useable as part of said compensation transforms to enable a scanner to produce scanned color space values of substantially as high a degree of accuracy with respect to a scannable object exhibiting said first material composition as with respect to a scannable object exhibiting said second material composition.

2. A method according to claim 1, wherein said compensation transforms for CMYK inks are processed for different levels of K using the formula $y=af_0(x)+(1-a)f_1(x)$, wherein y is the compensated output, x is the uncompensated output, $f_0(x)$ is a transform for a first K cube, $f_1(x)$ is a transform for a second K cube, and $\alpha$ is a scaling factor.

3. A method according to claim 1, further comprising the step of interpolating between different levels of K.

4. A method according to claim 1, wherein said first and second color reference patches represent different combinations of inks.

5. A method according to claim 1, further comprising the step of transforming a color value of a color patch based on the original ink values of said color patch.

6. A method according to claim 1, wherein said optical measuring device is a spectrophotometer.

7. A method according to claim 1, wherein said compensation transforms are a set of look up tables that map scanned uncompensated CIEL*a*b values to compensated CIEL*a*b values.

8. A method according to claim 1, wherein said compensation transforms are a set of look up tables that map scanned uncompensated CIEL*a*b values to compensated CIEL*a*b values for different combinations of ink values.

9. A method according to claim 1, further comprising the steps of mapping scanned CIEL*a*b values to optically measured CIEL*a*b values by using a CIEL*a*b to CMY transform with respect to said first and second scanned color space values and a CMY to CIEL*a*b transform with respect to said first and second measured color space values.

10. A method according to claim 1, wherein said compensation transforms are a set of look up tables constructed out of gamut CIEL*a*b values using the least squares algorithm with CIEL*a*b values in the tables that are in gamut.

11. A method according to claim 1, further comprising generating the first and second color reference patches.

12. A method according to claim 1, further comprising using an optical measuring device to measure the first and second color reference patches to produce the first and second measured color space values.

13. A method according to claim 1, wherein the first and second color reference patches exhibit respective first and second material compositions sufficiently different, one from the other, with respect to at least one selected from a group comprising respective inks, respective combinations of inks, respective paper, respective combinations of ink and paper, and combinations thereof, as to prevent a scanner, calibrated to one of such first and second material compositions, from producing scanned color space values of as high a degree of accuracy with respect to scannable objects exhibiting any other of such material compositions than said first and second material compositions.

14. A method according to claim 1, wherein the first and second color reference patches include at least two color reference patches exhibiting substantially the same color, and yet exhibit respective material compositions sufficiently different, one from the other, with respect to at least one selected from a group comprising respective inks, respective combinations of inks, and combinations thereof, as to prevent a scanner, calibrated to a one of such first and second material compositions from producing scanned color space values of as high a degree of accuracy with respect to scannable objects exhibiting the other of such first and second material compositions of said two color reference patches than with respect to scannable objects exhibiting said one of such first and second material compositions of said two color reference patches.

15. A method of producing compensation transforms comprising the steps of:
generating a plurality of color reference patches;
scanning said patches to produce color space values, wherein the scanning is performed with a calibrated scanner;
measuring said patches with an optical measuring device to produce measured color space values; and
creating a compensation table from said scanned color space values and said measured color space values;
wherein said compensation transforms for CMYK inks are processed for different levels of K using the formula $y=af_0(x)+(1-a)f_1(x)$, wherein y is the compensated output, x is the uncompensated output, $f_0(x)$ is a transform for a first K cube, $f_1(x)$ is a transform for a second K cube, and a is a scaling factor.

* * * * *